United States Patent Office 3,352,914
Patented Nov. 14, 1967

3,352,914
1,2-BIS(DIFLUORAMINO)ALKYLENE AROMATIC COMPOUNDS
Donald D. Perry, Morristown, and Joseph A. Castellano, Wayne, N.J., assignors to Thiokol Chemical Corporation, Bristol, Pa., a corporation of Delaware
No Drawing. Filed Sept. 27, 1965, Ser. No. 491,505
14 Claims. (Cl. 260—570.5)

This invention relates to the preparation of certain styrene and nitrostyrene derivatives.

More particularly, this invention concerns fluoraminated styrenes and nitrostyrenes and a method of preparing them. These novel compositions are useful as explosives, propellant additives and pesticides. These compounds are included within the structure:

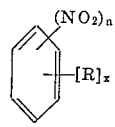

wherein $n$ is an integer ranging from 0 to and including 3, $x$ is an integer ranging from 1 to 2, and R is a difluoraminoalkyl radical.

It is an object of this invention to prepare novel compositions heretofore unreported in the literature.

A more specific object of this invention is to prepare novel compositions useful as explosives, propellant additives and pesticidal intermediates.

Further objects of this invention will become apparent after a further perusal of this application.

The above objects, among others, are accomplished by the method described more fully below.

In the preferred practice, the difluoramino group ($NF_2$) is introduced into the vinyl substituents of a nitrated styrene reactant until the difluoramino groups have been taken up into the vinyl groups. After the difluoramino groups have added across the points of unsaturation, the reaction is halted and chilled to condense the product and the noncondensible gases are stripped off under vacuum. The products are isolated from the reaction mixture by fractional distillation, preferably under vacuum. Further purification can be effected by the usual methods used to purify products in synthetic organic chemistry, namely, extraction chromatography, recrystallization and the like.

A second preparative process is to pass an inert gas diluted $N_2F_4$-nitrated styrene mixture through a coil type of reactor kept most conveniently between 50–200° C. The product and by-product gases are condensed in a low temperature trap. After 6–24 hours, depending upon flow rate, the styrene used and the size of the run, the reaction is halted and the product isolated and purified as before.

In a third method, the addition of $N_2F_4$ to the points of unsaturation of the nitrated styrene substituent(s) is accomplished using a pressurized reaction vessel such as an autoclave. In this process, the reaction can be conducted in the presence of inert solvent such as the polyhalogenated lower alkanes referred to as the "Freons." Conveniently, the styrene reactant is dissolved in the inert solvent and the $N_2F_4$ added to make up the reaction mixture. The reactor is sealed off under pressures ranging from 100–2000 p.s.i.g., preferably between 150–500 p.s.i.g. and heated between 50–350° C., preferably from 80 to 150° C., for a period of 4–36 hours. Experience has shown that for small scale runs in an autoclave, 8–16 hours is a feasible time. After the reaction is complete, the reactor is cooled down, the gases vented off and the inert solvent stripped off. The product is purified by vacuum distillation or any other convenient method.

A less desirable method that can be used is the separate fluoramination and nitration of the styrene. In this procedure $N_2F_4$ is reacted with styrene to form the fluoraminated styrene; then the product is subsequently nitrated to form the unresolved nitro mixture. As indicated by the above description, the reaction conditions are not critical to success and numerous modifications and substitutions can be made in the process without adversely affecting results. For example, the following represents the known range of permissible reaction conditions:

The ratio of the two reactants ranges from 1 mole of $N_2F_4$ to 1 mole of styrene derivative up to a large excess of $N_2F_4$ for each mole of styrene reactant used. The main requirement being that sufficient $N_2F_4$ be present to saturate the points of unsaturation on the styrene substituents. Smaller quantities will, of course, produce smaller amounts of product in the form of mixtures that are difficult to resolve. For this reason, an excess of $N_2F_4$ above that required by stoichiometry is preferred.

The presence of an inert solvent, while not necessary, is a convenience in some of the preparative methods such as the pressurized reactions, but can be dispensed with. The highly halogenated lower alkanes such as carbon tetrachloride, as well as the polyhalogenated 2 and 3 carbon alkanes known as the "Freons" are preferred for this purpose but other inert solvents such as the alkanes can be employed if desired.

As indicated by the described process variations, the pressure utilized can vary from subatmospheric through superatmospheric depending upon the type of process equipment available and the chemist's convenience.

The reaction time is dependent upon a number of experimental variables such as batch size, reaction temperature and pressure, the styrene used and the like. For these reasons, reaction time cannot be stated with precision. However, the extreme range appears to be between 4 to 48 hours with 12–24 hours being more typical.

Among the many styrene type reactants which can be used with $N_2F_4$ to prepare the products of this invention are the following styrenes: styrene, ortho-divinylbenzene, the ortho-dipropenylbenzenes, the meta-dibutenylbenzenes, the para-dipentenylbenzenes, the ortho-dihexenylbenzenes, the ortho-dipentenylbenzenes, the meta-dioctenylbenzenes and the like. Another group of styrene reactants which can be used are the nitrostyrenes. These include ortho, para- and meta-nitrostyrene,
2,3-dinitrostyrene,
2,4-dinitrostyrene,
2,5-dinitrostyrene,
2,6-dinitrostyrene,
2,3-dinitro-n-propenylbenzene,
2,4-dinitro-4'-butenylbenzene,
2,5-dinitro-5'-pentenylbenzene,
2,6-dinitro-6'-hexenylbenzene,
2,4,6-trinitrostyrene,
2,3,4-trinitrostyrene,
2,3,5-trinitrostyrene,
2,3,6-trinitrostyrene,
2,4,6-trinitro-n-propenylbenzene,
2,3,4-trinitro-4'-butenylbenzene,
2,3,5-trinitro-4'-pentenylbenzene,
2,3,6-trinitro-5'-hexenylbenzene, etc.

Among the many fluoraminated products of this invention which can be produced are the following:

1,2-bis(difluoramino)ethylbenzene,
1,2-bis(difluoramino)-1-(m-nitrophenyl)ethane,
1,2-bis(difluoramino)-1-(m-nitrophenyl)propane,
1,2-bis(difluoramino)-4-(o-nitrophenyl)butane,
1,2-bis(difluoramino)-5-(p-nitrophenyl)pentane, 1,2-bis(difluoramino)-6-(o-nitrophenyl)hexane,
1,2-bis(difluoramine)-2-(2',3'-dinitrophenyl)ethane,
1,2-bis(difluoramino)-3-(2',3'-dinitrophenyl)propane,
1,2-bis(difluoramino)-1-(2',4'-dinitrophenyl)ethane,
1,2-bis(difluoramino)-2-(2',5'-dinitrophenyl)ethane,
1,2-bis(difluoramino)-2-(2',6'-dinitrophenyl)ethane,
1,2-bis(difluoramino)-2-(2',4',6'-trinitrophenyl)ethane,
1,2-bis(difluoramino)-4-(2',4',6'-trinitrophenyl)hexane,
1,2-bis(difluoramino)-8-(2',4',6'-trinitrophenyl)octane,
1,2-bis(difluoramino)-4-(2',3',5'-trinitrophenyl)butane,
1,2-bis(difluoramino)-4-(2',3',4'-trinitrophenyl)pentane,
1,2-bis(difluoramino)-6-(2',3',5'-trinitrophenyl)hexane.

Also included within the scope of this invention are the tetrakis(difluoramino)-1,2 and 1,4-divinylbenzenes. These include tetrakis(difluoramino)-2-nitro-1,4-divinylbenzene and tetrakis(difluoramino)-4-nitro - 1,2 - divinylbenzene among others.

As indicated earlier, mixtures of nitrated fluoramine products can be prepared by contacting $N_2F_4$ with the appropriate styrene until the difluoramino groups are added across the unsaturation and nitrating the bis or tetrakis(difluoraminated)styrenes. Unfortunately, this process leads to complex mixtures of nitrofluoraminated styrenes which are tedious to resolve. For this reason, the process is not favored.

To indicate some of the various modifications possible in this invention, the following illustrative embodiments are submitted:

In one embodiment of this invention, 1,2-bis(difluoramino)ethylbenzene is prepared from commercially obtained styrene as follows:

In a suitable reactor equipped with a heating, cooling, stirring means as well as a means of distilling off and condensing products, is added 5 parts by weight of styrene dissolved in halogenated solvent such as Freon 113 used to moderate the reaction. The solution is degassed thoroughly by passing through a constant stream of nitrogen. After degassing, the styrene is frozen by dropping the temperature down to —100° C. To the frozen styrene is added 15 parts by weight of tetrafluorohydrazine ($N_2F_4$). After the two reactants are added, the cooling source is removed and the temperature brought first up to room temperature, then gradually heated to 80° C. The reaction is kept at this temperature for 6 hours and the reaction stopped by removing the heat. The reactor is allowed to come to room temperature and the crude product is purified by distillation under reduced pressure.

1,2-di[1',2'-bis(difluoramino)ethyl]benzene is prepared using the above procedure except that 1,2-divinylbenzene is used as the styrene reactant.

In this preparation, an 8 parts by weight portion of 1,2-divinylbenzene and 15 parts by weight of $$Cl_2CFCClF_2$$

is placed in a suitably equipped reaction vessel of the pressure bomb type. A 25 parts by weight portion of $N_2F_4$ had been previously frozen in the same vessel. The bomb is sealed and heated to 75° C. for 26 hours. After cooling the bomb to room temperature, the bomb is opened and the contents condensed at —78° C. and evacuated. The contents and volatile components are evaporated to dryness and taken up with cyclohexane. The crude solid is recrystallized from cyclohexane to yield a mixture of o-[1',2'-bis(difluoramino)ethyl]styrene and 1,2-di[1',2'-bis(difluoramino)ethyl]benzene.

In another embodiment, a mononitrostyrene and a moderate excess of tetrafluorohydrazine are reacted in an autoclave until the difluoramino derivative is formed, isolated, and purified. The preparation is as follows:

A 5 parts by weight portion of 2-nitrostyrene is dissolved in 25 ml. of Freon 113 and tetrafluorohydrazine (15 parts by weight) is added to the mixture. The reaction mixture is sealed in a stainless steel Hoke cylinder and kept overnight at 100° C. under an anitial pressure of about 230 p.s.i.g. At the end of this time, the reactor is cooled to room temperature and the solvent stripped off. The product is 1,2-bis(difluoramino)-1-(o-nitrophenyl)ethane. Analytical data confirms that the desired product is prepared.

In another similar embodiment, a mixture of 3 parts by weight portion of m-nitrostyrene(3-nitrostyrene), 6 parts by weight of $Cl_2CFCClF_2$ (Freon 113) is frozen in a stainless steel Hoke cylinder at about —78° C. and the cylinder evacuated. After alternatively freezing and thawing 3 times with intermittent evacuation, the cylinder is cooled to —196° C. and 3.7 parts by weight of tetrafluorohydrazine is condensed into the cylinder. The cylinder is heated to 35–40° C. for 10 hours then cooled to room temperature. The contents of the cylinder are condensed at —78° C. and the volatile components removed under vacuum. The nonvolatile portion of the reaction mixture is evaporated to dryness. The dry solid taken up into n-pentane, evaporated and recrystallized to yield colorless needles having a melting point of 40–41° C. and elemental analysis as follows.

Calcd. for : C, 37.96; H, 2.79; N, 16.60; F, 30.02. Found: C, 38.35; H, 2.92; N, 16.71; F, 30.17.

In another embodiment, a 10 parts by weight portion of 4-nitrostyrene is dissolved in 30 ml. of Freon 113 and tetrafluorohydrizine (25 parts by weight) are sealed into a stainless steel Hoke cylinder and kept for 24 hours at 155° C. under an initial pressure of 500 p.s.i. After cooling the reactor to room temperature, the Freon is distilled off and the product purified by distillation.

After recrystallizing from n-pentane, a product is obtained which analytical evidence indicates is 1,2-bis(difluoramino)-1-(p-nitrophenyl)ethane.

In a similar embdiment, 2,4-dinitrostyrene (2.5 parts by weight) is dissolved in 100 ml. of Freon 113 and 10.0 parts by weight of tetrafluorohydrazine are sealed into a stainless steel autoclave and kept for 15 hours at 160° C. at an initial pressure of 500 p.s.i.g. At the end of this time, the autoclave is cooled down and vented off. The solvent is distilled off and the products separated by fractional vacuum distillating. Analysis of the product confirms its identity as 1,2-bis(difluoramino)-1-(2',4'-dinitrophenyl)ethane.

In yet another embodiment, a 10 parts by weight portion of 3,5-dinitro-4'-butenylbenzene is dissolved in 50 ml. of Freon 113 and 50 parts by weight of tetrafluorohydrazine are sealed into an autoclave for 15 hours at 140° C. at an initial pressure of 250 p.s.i.g. At the end of this time, the autoclave is cooled down and vented off. The solvent is distilled off and the product separated from the reaction mixture by fractional vacuum distillation. Analysis indicates that the expected product 1,2-bis(difluoramino)-4-(3',5'-dinitrophenyl)butane is obtained.

In a further embodiment, a 2.0 parts by weight portion of 2,6-dinitro-6'-hexenylbenzene is dissolved in 5.0 parts by weight of Freon 113 and 20.0 parts by weight of tetrafluorohydrazine is added to the mixture and the reaction mixture is sealed in an autoclave. The autoclave is brought to 200° C. and 500 p.s.i. and the reaction is continued for 36 hours then cooled to room temperature and vented. The solvent is distilled off and the product fractionated under a high vacuum. Analytical data confirms the identity of the desired 1,2-bis(difluoramino)-6-(3',6'-dinitrophenyl)hexane.

In yet another embodiment, 1,2-bis(difluoramino)-3-(2',3',6'-trinitrophenyl)propane is prepared by contacting 5 parts by weight of 2,3,6-trinitro-n-propenylbenzene with 50 parts by weight of tetrafluorohydrazine under nitrogen in an autoclave. The autoclave is pressurized at 500 p.s.i. and sealed and heated for 15 hours at 125° C. At the end of this time, the autoclave is cooled down and vented off. The product is separated and purified by fractional distillation under reduced pressure. Analysis confirms that the above product is produced.

In another embodiment, 20 parts by weight of ortho-divinylbenzene, 100 parts by weight of tetrafluorohydrazine are sealed into an autoclave under a nitrogen atmosphere at an initial pressure of 520 p.s.i.g. The autoclave is then heated to about 125° C. and maintained there for about 12 hours. At the end of this time, the autoclave and its contents are cooled to room temperature and the excess pressure vented off. The reaction product is then distilled under reduced pressure to give the product, tetrakis(difluoramino)-1,2-divinylbenzene. Analytical data confirms the identity of the product.

In a related embodiment, 2.0 parts by weight portion of 2,3,4-trinitro-n-propenylbenzene dissolved in 10.0 parts by weight of Freon 113 is mixed with 10.0 parts by weight of tetrafluorohydrazine in an autoclave pressurized with nitrogen at 500 p.s.i.g. The autoclave and contents are heated to 125° C. for 15 hours then cooled to room temperature. The excess pressure is vented off and the Freon stripped off. The residue is purified by fractional distillation under reduced pressure to give 1,2-bis(difluoramino)-3-(2',3',4'-trinitrophenyl)propane. Analysis confirms the identity of the product.

The above discussion and the numerous embodiments disclosed throughout this application are illustrative of the many aspects of this invention and the numerous modifications and variations that can be made without departing from the inventive concept. The metes and bounds of this invention are best shown by the claims which follow.

What is claimed is:
1. A compound of the formula:

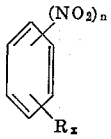

wherein $n$ is an integer from 0 to 3, $x$ is an integer from 1 to 2, and R is a difluoraminoalkyl radical of from 2 to 6 carbon atoms.

2. 1,2-bis(difluoramino)phenylethane.
3. 1,2-di[1',2'-bis(difluoroamino)ethyl]benzene.
4. 1,2-bis(difluoramino)-1-(2'-nitrophenyl)ethane.
5. 1,2-bis(difluoramino)-1-(m-nitrophenyl)ethane.
6. 1,2-bis(difluoramino)-1-(p-nitrophenyl)ethane.
7. 1,2-bis(difluoramino)-1-(2',4'-dinitrophenyl)ethane.
8. 1,2-bis(difluoramino)-4-(3',5'-dinitrophenyl)butane.
9. 1,2-bis(difluoramino)-6-(3',5'-dinitrophenyl)hexane.
10. 1,2 - bis(difluoramino) - 3 - (2',3',4' - trinitrophenyl)propane.
11. 1,2-bis(difluoramino)-6-(2',6'-dinitrophenyl)hexane.
12. 1,2-bis(difluoramino)-2-(2',6'-dinitrophenyl)ethane.
13. 1,2-bis(difluoramino)-2-(2',3',6'-trinitrophenyl)ethane.
14. 1,2-bis(difluoramino)-3-(2',3',6'-trinitrophenyl)propane.

References Cited

UNITED STATES PATENTS 3,196,167  7/1965  Logothetis _____ 260—397.2
3,215,709  11/1965  Logothetis _____ 260—349

CHARLES B. PARKER, *Primary Examiner.*

CARL D. QUARFORTH, *Examiner.*

R. HINES, L. A. SEBASTIAN, *Assistant Examiners.*